(12) United States Patent
Oguri

(10) Patent No.: US 6,175,212 B1
(45) Date of Patent: Jan. 16, 2001

(54) CHARGING PADDLE

(75) Inventor: Kouji Oguri, Kariya (JP)

(73) Assignees: Kabushiki Kaisha Toyoda Jidoshokki Seisakusho, Kariya; Toyota Jidosha Kabushiki Kaisha, Toyota, both of (JP)

(*) Notice: Under 35 U.S.C. 154(b), the term of this patent shall be extended for 0 days.

(21) Appl. No.: 09/420,926

(22) Filed: Oct. 19, 1999

(30) Foreign Application Priority Data

Oct. 27, 1998 (JP) .................................................. 10-305504

(51) Int. Cl.$^7$ ............................... H02J 7/00; H01F 27/28
(52) U.S. Cl. ..................... 320/108; 320/104; 336/DIG. 2
(58) Field of Search .................................... 320/104, 108; 336/DIG. 2

(56) References Cited

U.S. PATENT DOCUMENTS 5,412,304   5/1995  Abbott .
5,463,303  10/1995  Hall et al. .

FOREIGN PATENT DOCUMENTS 8-064442    8/1996  (JP) .
9-182303    7/1997  (JP) .
10-106867   4/1998  (JP) .
10-106869   4/1998  (JP) .
10-191572   7/1998  (JP) .

*Primary Examiner*—Shawn Riley
*Assistant Examiner*—Gregory J. Toatley, Jr.
(74) *Attorney, Agent, or Firm*—Morgan & Finnegan, L.L.P.

(57) ABSTRACT

A relatively thin charging paddle that is cooled during charging. When charging a battery, the charging paddle is plugged into a receptacle. At this time the paddle is insulated from the receptacle. Electricity is supplied to a thin annular primary coil of the charging paddle via a conductor wire, which induces electromotive force in a secondary coil in the receptacle. A coolant chamber is formed in the paddle to cool the primary coil. The shape of the coolant chamber corresponds to that of the primary coil. A location at which cooling water is supplied to and drained from the coolant chamber is spaced from another location at which the wire is connected to the primary coil.

20 Claims, 6 Drawing Sheets

CHARGING PADDLE

BACKGROUND OF THE INVENTION

The present invention relates to a charging paddle for charging batteries of electric vehicles.

A typical electric vehicle has a receptacle housing a secondary coil. To initiate charging of a battery in the vehicle, a charging paddle, which includes a primary coil, is inserted into the receptacle. The charging paddle is attached to the distal end of a cable connected to an electricity supplying apparatus. Specifically, the supplying apparatus converts the voltage and frequency of commercial alternating current into a current having a voltage of 430 volts and a high frequency of 100 kHz to 370 kHz. The converted current is supplied to the primary coil in the charging paddle by the cable. The primary coil induces an electromotive force in the secondary coil in the receptacle, which charges the vehicle battery.

To shorten the time required for charging, or to perform a boosting charge, charger couplings that transmit a current of a relatively great power, for example, a power of 80 kW, have been developed.

However, a higher charger coupling current results in a greater primary coil current, which causes the primary coil to generate a great amount of heat. The heat may damage devices about the primary coil and deform resin members. To solve this problem, a charging paddle 60 disclosed in Japanese Unexamined Patent Publication No. 7-169628 has a multi-layered coolant conduit 62 (only one of the layers is shown) for cooling a primary coil (not shown). As shown in FIG. 11, the charging paddle 60 is connected to a cable 61. Coolant is supplied from the cable 61 to the paddle 60. The coolant flows along arrows in the coolant conduit 62 and back to the cable 61. The primary coil is located either inside or outside the coolant conduit 62. In other words, the coolant conduit 62 and the primary coil are arranged in direction perpendicular to the plane of the paddle. Heat generated by the primary coil during charging is transferred to the coolant flowing in the conduit 62.

Japanese Unexamined Patent Publication No. 8-64442 discloses a charging paddle having a space for conducting coolant in a primary coil. Coolant flows through the space to cool the primary coil and a secondary coil.

A primary coil must be connected to wiring that supplies electricity. In FIG. 11, lines in the cable 61 are connected to the primary coil. The joint between the lines and the primary coil must be electrically insulated from the coolant conduit 62 to prevent electricity from leaking.

However, the coolant conduit 62 has a plurality of conduit units arranged in the radial direction of the core 63. Therefore, the joint between the primary coil and the electric line overlaps the coolant conduit 62 in the direction perpendicular to the plane of the paddle, which increases the thickness of the charging paddle 60. Also, in the charging paddle of the Publication No. 8-64442, the space provided for the coolant liquid increases the thickness dimension of the charging paddle. The size of the receptacle must be increased, accordingly. The receptacle will therefore take up a large space in the vehicle.

SUMMARY OF THE INVENTION

Accordingly, it is an objective of the present invention to provide a charging paddle that is thin and effectively cools coils when charging a battery.

To achieve the foregoing and other objectives and in accordance with the purpose of the present invention, a charging paddle of a charger coupling is provided. The charging paddle has a generally planar shape and is plugged into and is insulated from a receptacle when charging a battery connected to the receptacle. The charging paddle includes a thin primary coil for inducing electromotive force in the receptacle, a wire for supplying electricity to the primary coil, a first location at which the wire is connected to the primary coil and a coolant chamber shaped to correspond to the shape of the primary coil. Coolant flows through the coolant chamber to cool the primary coil. The paddle further includes an inlet conduit for supplying coolant to the coolant chamber, an outlet conduit for draining coolant from the coolant chamber and a second location at which the inlet conduit and the outlet conduit are connected to the coolant chamber. The second location is spaced apart from the first location.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

An inductive charger coupling according to a first embodiment of the present invention will now be described with reference to FIGS. 1 to 7.

Figure 1:
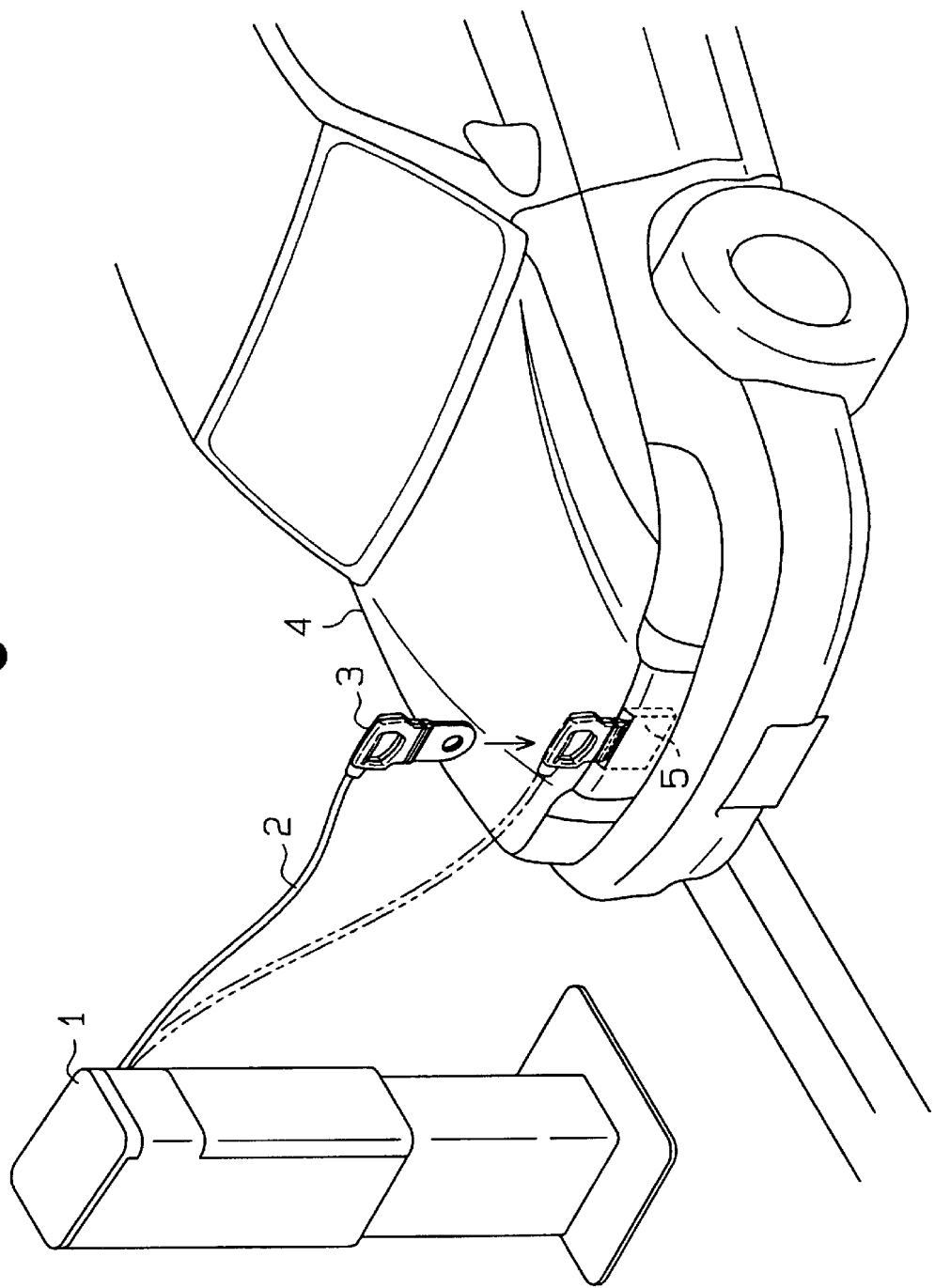
FIG. 1 is a perspective view illustrating a charger coupling for a electric vehicle according to a first embodiment.
Figure 2:
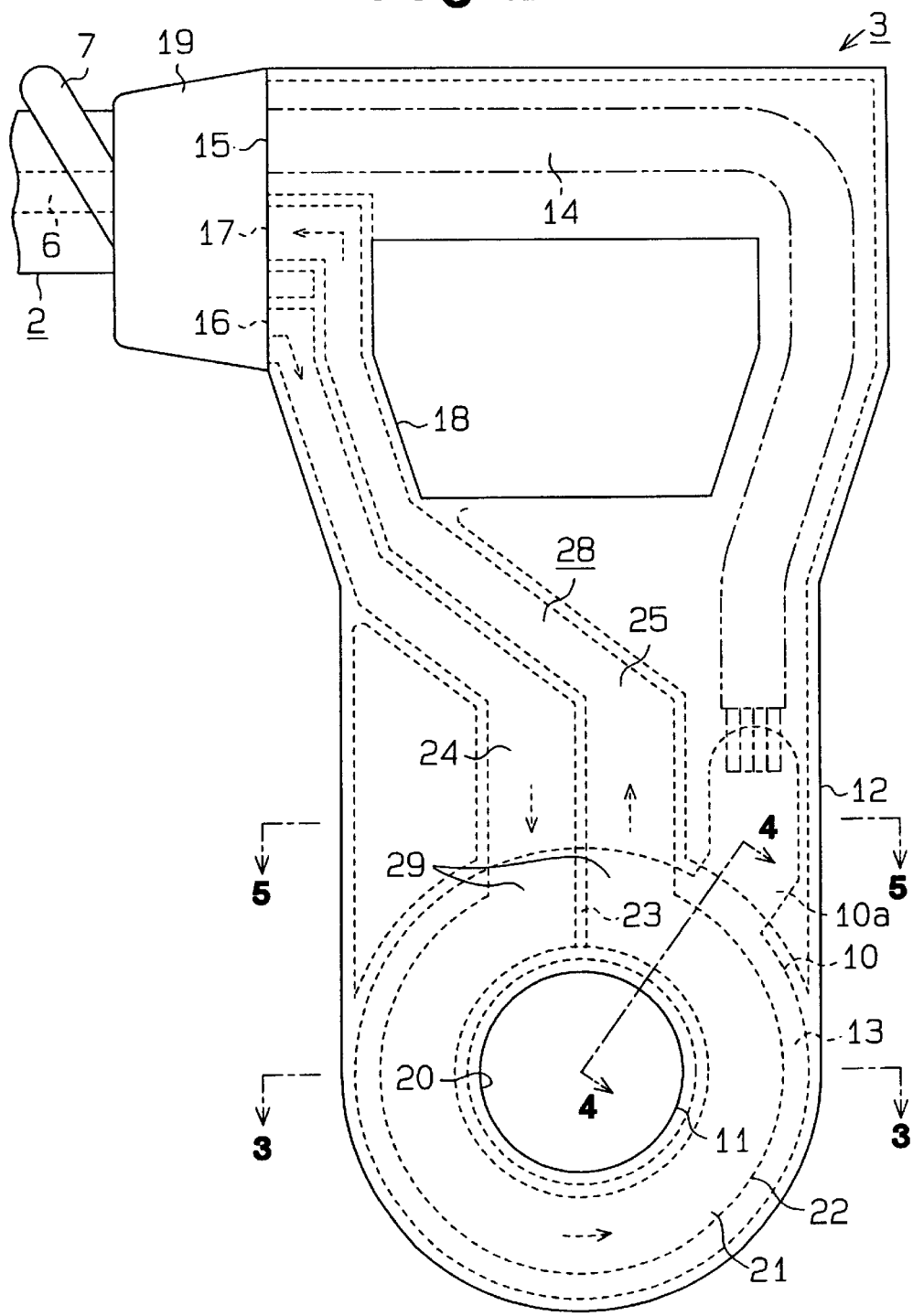
FIG. 2 is a plan view illustrating the charging paddle of FIG. 1.

FIG. 1 illustrates a charger coupling for electric vehicles. FIG. 2 is a plan view illustrating a charging paddle 3 according to the first embodiment of the present invention.

As shown in FIG. 1, the inductive charger coupling includes the charging paddle 3 and a receptacle 5. The charging paddle 3 is coupled to a cable 2, which is connected to an electricity supplying apparatus 1. The electricity supplying apparatus 1 is located in a garage. The receptacle 5 is mounted on an electric vehicle 4. When charging a battery in the vehicle 4, the vehicle 4 is parked in the garage, which is equipped with the electricity supplying apparatus 1. Then, the charging paddle 3 is plugged into the receptacle 5 of the vehicle 4.

Specifically, the electricity supplying apparatus 1 converts the voltage and frequency of commercial alternate current into a high frequency current having, for example, a voltage of 430V and a frequency of 370 kHz. The apparatus 1 supplies the high frequency current to the charging paddle 3 via the cable 2. The apparatus 1 also includes a coolant pump (not shown) to circulate cooling water to the paddle 3 via the cable 2. In addition to a conductor wire 14 for supplying electricity, the cable 2 includes a supply hose 6 and a return hose 7 for circulating cooling water.

Figure 3:
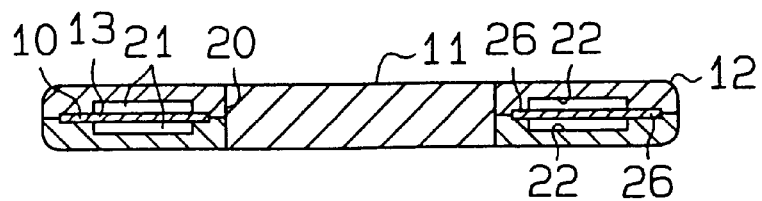
FIG. 3 is a cross-sectional view taken along line 3—3 of FIG. 2.
Figure 4:
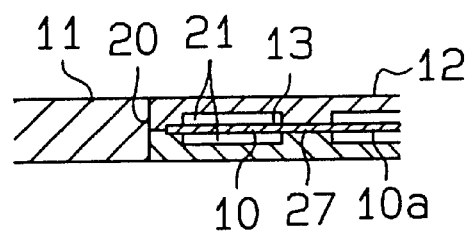
FIG. 4 is a cross-sectional view taken along line 4—4 of FIG. 2.
Figure 5:
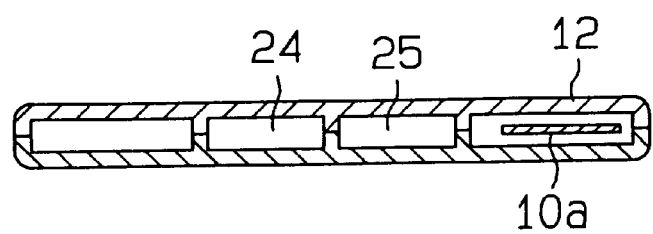
FIG. 5 is a cross-sectional view taken along line 5—5 of FIG. 2.

The structure of the charging paddle 3 will now be described with reference to FIGS. 2 to 5. FIG. 3 is a cross-sectional view taken along line 3—3 of FIG. 2, and FIG. 4 is a cross-sectional view taken along line 4—4 of FIG. 2. FIG. 5 is a cross-sectional view taken line 5—5 of FIG. 2.

As shown in FIG. 2, the charging paddle 3 includes a thin annular primary coil plate 10, a cylindrical ferrite core 11 and a coil cover 12. The primary coil plate 10 includes a primary coil 13. The primary coil 13 is a multi-layered substrate having copper foils layered with insulated-substrates. In this embodiment, the primary coil 13 includes four copper foils. Specifically, four C-shaped copper foils are alternately layered with insulating substrates. The ends of the copper foils are electrically connected such that electric current flows spirally. An insulating coating is formed on each side of the primary coil 13. A terminal 10*a* extends from the coil base plate 10. The laminated copper foils of the primary coil 13 are extended on the terminal 10*a*. A conductor wire 14 extends from the cable 2 and is electrically connected to the terminal 10*a*.

As shown in FIGS. 3 to 5, the coil cover 12 includes two insulated resin cover members. An opening 18 is formed at a rear portion of the paddle 3. An operator holds the paddle 13 by the opening 18. A cable opening 15, a coolant inlet 16 and a coolant outlet 17 are formed in the vicinity of the opening 18. The conductor wire 14 is inserted through the cable opening 15. The supply hose 6 and the return hose 7 are connected to the inlet 16 and the outlet 17, respectively. The conductor wire 14, the supply hose 6 and the return hose 7 are separated from the cable 2 in a neck portion 19. A circular opening 20 is formed in the front portion the coil cover 12. The core 11 is located in the opening 20.

As shown in FIGS. 2 to 4, an annular groove 22 is formed about the opening 20 in each cover member of the coil cover 12. The grooves 22 define an annular coolant chamber 21. The coolant chamber 21 conducts cooling water for cooling the coil 13. The chamber 21 is divided by a wall 23 and connected to an inlet conduit 24 and an outlet conduit 25 at the sides of the wall 23 as illustrated in FIGS. 2 and 5. The inlet and outlet conduits 24, 25 extend to the inlet 16 and the outlet 17, respectively. In this manner, the inlet conduit 24 and the outlet conduit 25 are laterally separated, not stacked. As shown in FIG. 3, each cover member of the coil cover 12 has a holder groove 26 adjacent to the groove 22 to hold the peripheral portion of the primary coil plate 10.

When assembling the charging paddle 3, the primary coil plate 10 is connected to the conductor wire 14. Then, the coil plate 10 and the wire 14 are placed between the cover members of the coil cover 12 such that the periphery of the plate 10 is located between the grooves 26. The core 11 is inserted in the opening 20. Next, the cover members are pressed against each other and bonded by ultrasonic welding. A seal member may be fitted between the terminal 10*a* and a part 27 of the cover 12 contacting the terminal 10*a* to prevent the cooling water from leaking.

The annular chamber 21, the inlet conduit 24 and the outlet conduit 25 form a coolant passage 28 in the charging paddle 3. Coolant water enters the paddle 3 through the inlet 16 and flows in the passage 28 along arrows of dotted lines in FIG. 2. That is, the cooling water flows from the inlet conduit 24 to the outlet conduit 25 via the annular chamber 21, and then exits the paddle 3 through the outlet 17. As shown in FIGS. 3 and 4, the annular chamber 21 is divided by the primary coil plate 10 into two sub chambers, which are stacked, or aligned in a direction perpendicular to the paddle 3. That is, the annular chamber 21 includes first and second sub chambers, which have the same thickness as measured in the axial direction of the hole 20. The heated primary coil 13 is effectively cooled by cooling water flowing above and below the base plate 10.

In this embodiment, the location of the terminal 10*a*, which is connected to the conductor wire 14, is referred to as a first location. The location of junctions 29 between the annular chamber 21 and the inlet and outlet conduits 24, 25 is referred to as a second location. The supply hose 6 and the return hose 7 in the cable 2 are connected to a coolant pump located in the electricity supplying apparatus 1. The pump circulates cooling water from the supply hose 6 to the return hose 7 via the coolant passage 28 in the charging paddle 3.

Figure 6:
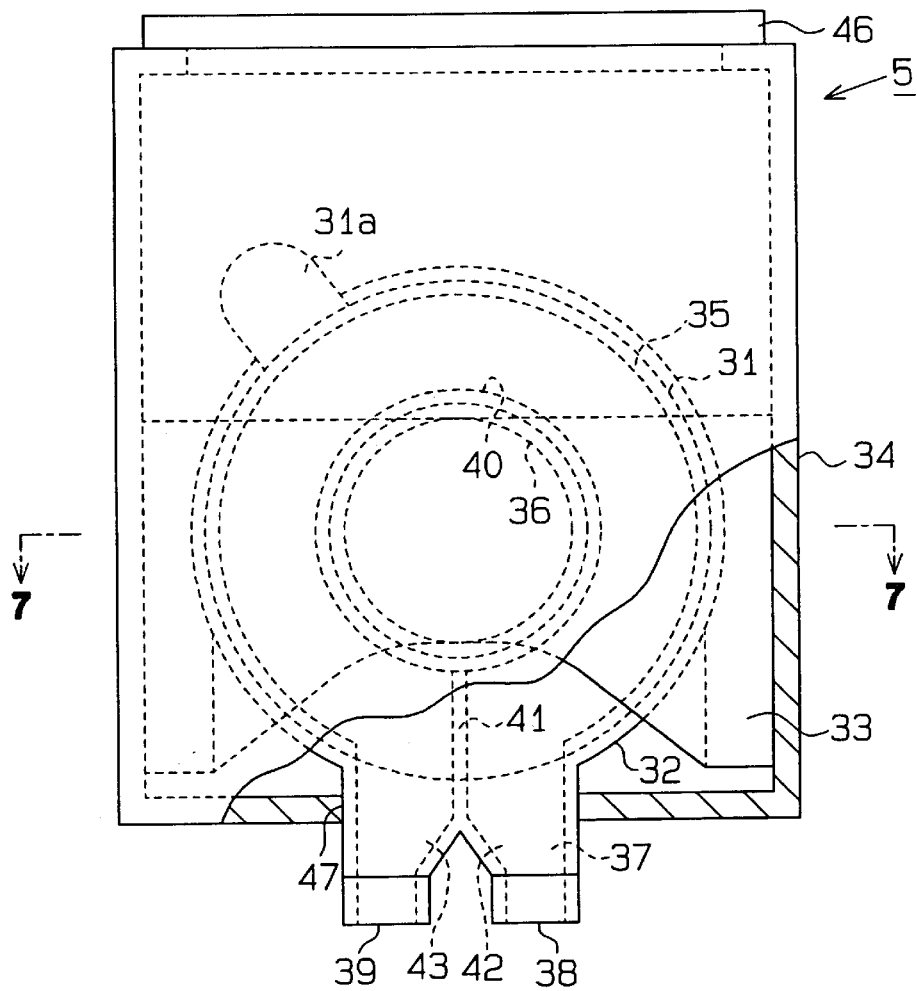
FIG. 6 is a plan view illustrating the receptacle of FIG. 1 into which the charging paddle of FIG. 2 is plugged.

The structure of the receptacle 5 will now be described with reference to FIGS. 6 and 7. FIG. 6 is a plan view of the receptacle 5, and FIG. 7 is a cross-sectional view taken along line 7—7 of FIG. 6 when the charging paddle 3 is plugged into the receptacle 5.

As shown in FIG. 6, the receptacle 5 includes a thin annular secondary coil plate 31, a coil cover 32, a ferrite core 33 and a casing 34. Like the primary coil plate 10, the secondary coil plate 31 includes a secondary coil 35. The secondary coil 35 is a multi-layered substrate having copper foils layered with insulating substrates. In this embodiment, the secondary coil 31 includes four copper foils. Specifically, four C-shaped copper foils are alternately layered with insulating substrates. The ends of the copper foils are electrically connected such that electric current flows spirally. An insulating coating is formed on each side of the secondary coil 35. A terminal 31*a* extends from the coil base plate 31. The laminated copper foils of the secondary coil 35 are radially extended to form the terminal 31*a* as shown in FIG. 6. As shown in FIG. 7, the secondary coil plate 31 is identical with the primary coil plate 10 except that the terminals 10*a* and 31*a* are different. That is, the primary coil 13 and the secondary coil 35 have the same dimensions. When the charging paddle 3 is plugged into the receptacle 5, the primary coil 13 and the second coil 35 are axially aligned as shown in FIG. 7.

Figure 7:
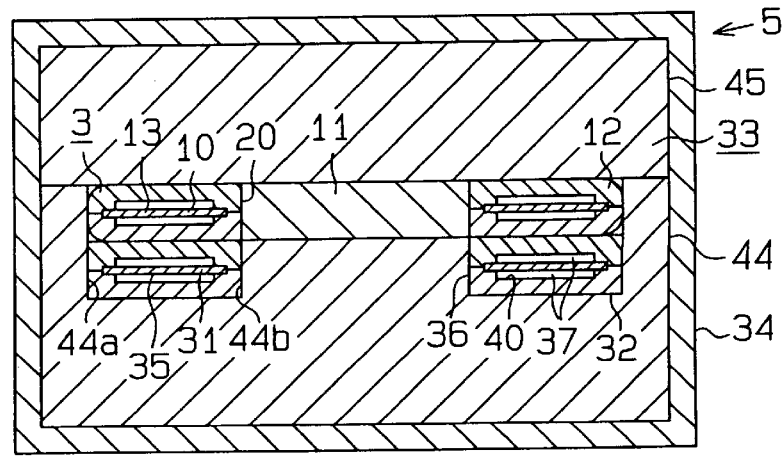
FIG. 7 is a cross-sectional view taken along line 7—7 of FIG. 6.

As shown in FIG. 7, the coil cover 32 has two insulated resin cover members. An opening 36 is formed in the coil cover 32. The diameter of the opening 36 is equal to that of the opening 20 of the coil cover 12. As shown in FIGS. 6 and 7, a coolant passage 37 is formed in the coil cover 32. Specifically, a groove 40 is defined about the opening 36. The groove 40 functions as a part of the coolant passage 37. A wall 41 divides the groove 40. A supply conduit 42 and a return conduit 43 extend from the sides of the wall 41 to an inlet 38 and an outlet 39 formed at the rear end of the coil cover 32. The inlet 38 and the outlet 39 are connected to hoses connected to a radiator (not shown). Coolant from the radiator is supplied to and drained from the receptacle 5 via the inlet 38, the outlet 39 and the hoses. The cover members of the coil cover 32 are bonded by ultrasonic welding. Specifically, the cover members are pressed against each other with the secondary coil plate 31 fitted in between and are then bonded by ultrasonic welding.

When the cover members are bonded to form the coil cover 32, the coolant passage 37 is defined in the cover 32. Coolant entering the inlet 38 flows to the outlet 39 via the coolant passage 37. That is, as shown in FIG. 7, coolant flows above and below the secondary coil plate 31, which effectively cools the secondary coil 35.

As shown in FIG. 7, the core 33 includes a lower core piece 44, which has a generally E-shaped cross-section, and an upper core piece 45, which has an I-shaped cross section. Specifically, a groove 44a is formed in the lower core piece 44 to accommodate the coil cover 43. A circular projection 44b is formed in the center of the groove 44a. The height of the projection 44b is the same as the thickness of the coil cover 32, which accommodates the secondary coil plate 31. When the charging paddle 3 is plugged into the receptacle 5, the cores 11 and 33 form a magnetic circuit through the primary and secondary coils 13 and 35. Electric current in the primary coil 13 induces electromagnetic force in the secondary coil 35.

As shown in FIG. 6, an opening 46 is formed in the front portion of the casing 34 to receive the charging paddle 3. Another opening 47 is formed in the back to draw the coolant passage 37 out. The receptacle 5 is formed by housing the coil cover 32 and the core 33 in the casing 34.

The vehicle 4 has a transmitter (not shown) to transmit information regarding the battery to the power supply apparatus 1. The transmitted information includes the amount of electricity in the battery, the magnitude of inductive force generated by the secondary coil 35, or the charging voltage. The electricity supplying apparatus 1 controls the electricity to optimize the charging based on the received information.

The operation of the above described charger coupling will now be described.

First, an operator plugs the charging paddle 3 into the receptacle 5 of the vehicle 4 as shown in FIG. 1. As illustrated in FIG. 7, the core 11 and the primary coil 13 of the charging paddle 3 are adjacent to but electrically insulated from the core 33 and the secondary coil 35 of the receptacle 5. Thereafter, the electricity supplying apparatus 1 supplies high frequency electricity of 430V and 370 kHz to the primary coil 13. At the same time, the supply apparatus 1 actuates the cooling pump thereby sending coolant to the coolant passage 28 of the paddle 3.

At this time, the high frequency and great magnitude current is supplied to the primary coil 13 of the paddle 3, which heats the primary coil 13. Coolant water circulates in the coolant passage 28 (inlet conduit 24 to the outlet conduit 25 via the coolant chamber 21) and cools the primary coil 13. The cooling water is then drained from the outlet 17. That is, the cooling water flows in a direction of arrows in FIG. 2 in the coolant chamber 21, the shape of which is annular to match the shape of the primary coil 13, and cools the primary coil 13.

Coolant water from the vehicle radiator is supplied to the coolant passage 37 of the receptacle 5, which cools the heated secondary coil 35.

The charger coupling of FIGS. 1 to 7 has the following advantages.

(1) When charging the vehicle battery, the charging paddle 3 is plugged into the receptacle 5 mounted on the vehicle 4 as illustrated in FIG. 3. In this state, the paddle 3 is electrically insulated from the receptacle 5. Then, the electricity supplying apparatus 1 supplies electricity to the primary coil 13 in the paddle 3, which induces electromotive force in the secondary coil 35 of the receptacle 5. Accordingly, the vehicle battery is charged. At this time, cooling water is supplied to the coolant chamber 21 formed in the paddle 3 to cool the heated primary coil 13. The second location, at which the coolant chamber 21 is connected to the inlet and outlet conduits 24, 25, is spaced from the first location, at which the conductor wire 14 is connected to the primary coil 13. In other words, the second location is laterally spaced from the first location, which reduces the thickness of the paddle 3. Accordingly, the thickness of the space defined in the receptacle 5 to receive the paddle 3 can be smaller. As a result, the receptacle 5 can be smaller, which increases the available space for other parts of the vehicle 4.

(2) As shown in FIG. 2, the inlet conduit 24 and the outlet conduit 25 extend from the junctions 29 to the inlet 16 and the outlet 17, respectively. Coolant water flows into the inlet conduit 24 from the supply hose 6 in the cable 2 and is supplied to the coolant chamber 21 from the inlet junction 29. The cooling water flows through the chamber 21 and is then conducted to the outlet conduit 25 via the outlet junction 29 to flow out to the return hose 7 of the cable 2. The inlet conduit 24 and the outlet conduit 25 are spaced apart from the wire 14, which supplies electricity to the primary coil 13. Therefore, the conductor wire 14 and the conduits 24, 25 are not stacked in a direction normal to the plane of the paddle 3, which reduces the thickness of the paddle 3. Also, the structure of the paddle 3 positively insulates the wire 14 from cooling water, which prevents electricity from leaking to the cooling water.

(3) As shown in FIG. 2, the opening 18 of the paddle 3 forms a handle. The conductor wire 14 is located one side of the opening 18 and the conduits 24, 25 are located at the other side of the opening 18. In other words, the wire 14 and the conduits 24, 25 are separated from each other, which ensures the insulation of the cable 14 from the cooling water in the paddle 3.

The cable opening 15 is formed in the rear portion of the paddle 3, which is relatively thick compared to the front portion. The conductor wire 14, which extends from the cable 2, enters the cable opening 15. Further, the supply hose 6 and the return hose 7 extending from the cable 2 are connected to the inlet 16 and the outlet 17, which are formed in the rear portion of the paddle 3. Coolant water is supplied to and is drained from the paddle 3 via the inlet 16 and the outlet 17. In this manner, since the cable 2 is connected to the paddle 3 at a portion close to the handle, the cable 2 is easy to handle.

(4) The primary coil 13 includes the four copper foils, which are laminated with the insulated substrates in between. This structure reduces the size of the primary coil 13, which reduces the size of the paddle 3.

(5) As shown in FIG. 3, the coolant chamber 21 is divided by the primary coil plate 10, which is planar and coplanar to the plane of the paddle 3. The primary coil plate 10 divides the chamber passage 21 into two annular spaces having the same thickness, which keeps the weight of the paddle 3 in balance.

Figure 8:
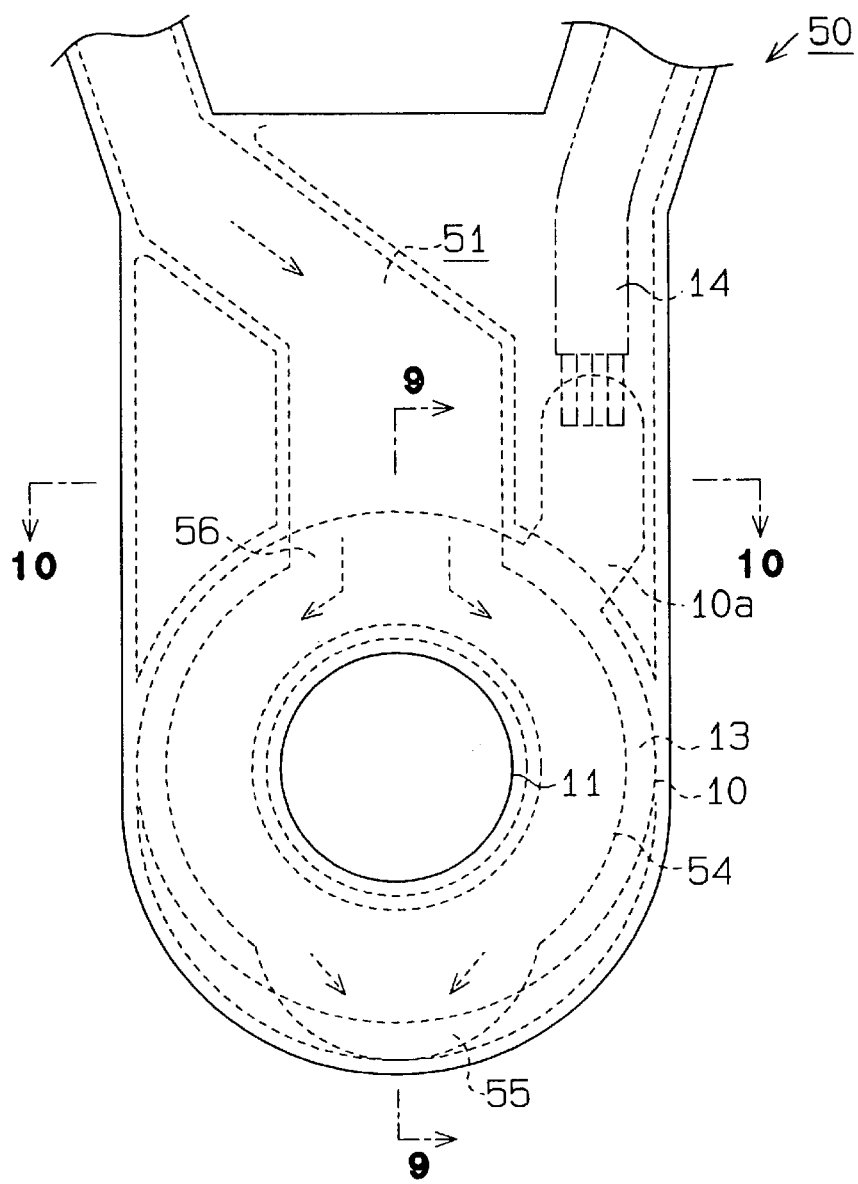
FIG. 8 is a plan view showing a charging paddle according to a second embodiment of the present invention.

A charging paddle 50 according to a second embodiment of the present invention will now be described with reference to FIGS. 8 to 10. The charging paddle 50 is different from the charging paddle 3 of FIG. 2 in that the coolant passage 28 is replaced by a coolant passage 51. Therefore, like or the same reference numerals are given to those components that are like or the same as the corresponding components of the embodiment of paddle 3.

Figure 9:
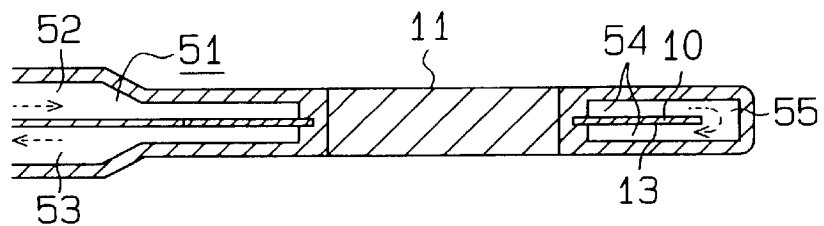
FIG. 9 is a cross-sectional view taken along line 9—9 of FIG. 8.
Figure 10:
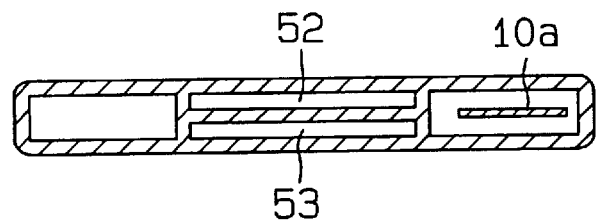
FIG. 10 is a cross-sectional view taken along line 10—10 of FIG. 8.
Figure 11:
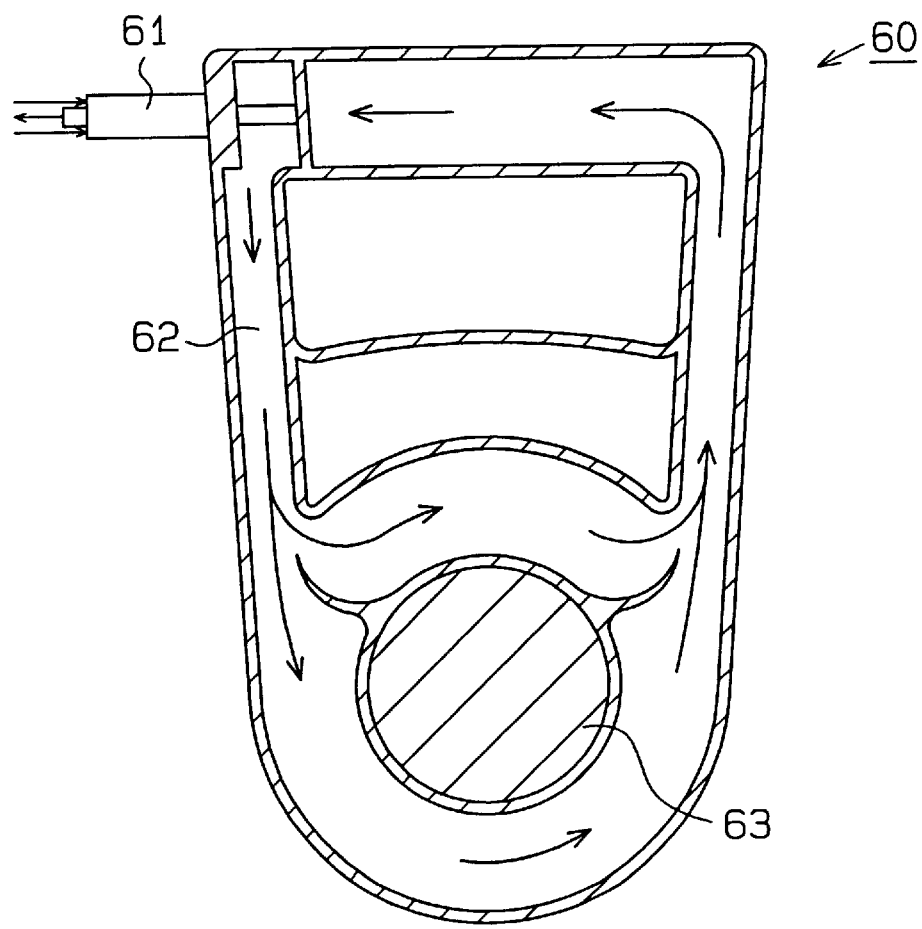
FIG. 11 is a cross-sectional view illustrating a prior art charging paddle.

As illustrated in FIGS. 9 and 10, an inlet conduit 52 is formed at one side of the paddle 50 (upper side in the drawings). An outlet conduit 53 is formed at the other side (lower side as viewed in the drawings). The inlet conduit 52 and the outlet 53 are stacked, or aligned in a direction perpendicular to the plate 10. In other words, the inlet conduit 52 and the outlet conduit 53 are separated by a plate, which is perpendicular to the axis of the core 11. As shown in FIGS. 8 and 9, a coolant chamber 54 is shaped to correspond to the shape of the primary coil 13. The chamber 54 is divided by the primary coil plate 10 as shown into upper and lower sub chambers. The sub chambers are joined with each other by a connecting passage 55, which is formed at the distal end of the paddle 50.

The coolant chamber 54, the inlet conduit 52 and the outlet conduit 53 form a coolant passage 51. The coolant passage 51 is divided by the plate 10 as shown in FIG. 9. Coolant water is supplied from the inlet conduit 52 and flows on the upper side of the primary coil plate 10. The coolant then flows to the lower side via the connecting passage 55 and flows out of the passage 51 through the outlet conduit 53.

As in the embodiment of FIGS. 1 to 7, the location of the terminal 10a of the primary coil plate 10 is referred to a first location, and the junctions between the coolant chamber 54 and the passages 52, 53 are located at a second location.

The paddle 50 has the following advantage.

(1) When charging the vehicle battery, the primary coil 13 generates heat. At this time, coolant flows on the upper side of the primary coil plate 10 to the lower side of the plate 10 via the connecting passage 55 formed at the distal end of the paddle 50, which effectively cools the primary coil 13. The first location (terminal 10a) does not overlap the second location (junctions where the cooling passages 52, 53 meet the chamber 54) and is laterally spaced from the second location, which reduces the thickness of the paddle 50.

It should be apparent to those skilled in the art that the present invention may be embodied in many other specific forms without departing from the spirit or scope of the invention. Particularly, it should be understood that the invention may be embodied in the following forms.

In the embodiment of FIGS. 1 to 7, the receptacle 5 has the coolant passage 37 to cool the secondary coil 35 as illustrated in FIGS. 6 and 7. However, the coolant passage 37 may be omitted. That is, if the paddle 3 is made thinner and the cooling capacity of the coolant passage 28 is enhanced, the coolant passage 28 will be able to cool not only the primary coil 13 but also the secondary coil 35. Accordingly, the coolant passage 37 may be omitted from the receptacle 5.

In the illustrated embodiments, water is used as coolant. However, any type of non-magnetic liquid that does not generate eddy currents may be used as the coolant. If an insulating liquid, for example, an insulating oil, is used as the coolant, the insulating coating does not need to be formed on the primary coil 13. In other words, the primary coil 13 may be exposed at the surface of the primary coil plate 10, which reduces the thickness of the charging paddle 3.

In the illustrated embodiment, the primary coil 13 of the charging paddle 3 is laminated in the primary coil plate 10. However, the primary coil plate 10 may be omitted.

In the illustrated embodiments, the coil cover 12 is formed by adhering two cover members through ultrasonic welding. However, the coil cover 12 may be formed through molding.

In the illustrated embodiments, the electricity supplying apparatus 1 is located in a garage. However, the apparatus may 1 may be located in a commercial charging station.

In the illustrated embodiments, the charging coupling is applied to the electric vehicle 5. However, the charging coupling any battery-powered vehicles. For example, the charging coupling may be used for battery-powered motor truck and industrial vehicle.

What is claimed is:

1. A charging paddle of a charger coupling, the charging paddle having a generally planar shape, wherein the charging paddle is plugged into and is insulated from a receptacle when charging a battery connected to the receptacle, wherein the charging paddle comprises:

a primary coil for inducing electromotive force in the receptacle;

a wire for supplying electricity to the primary coil;

a first location at which the wire is connected to the primary coil;

a coolant chamber shaped to correspond to the shape of the primary coil, wherein coolant flows through the coolant chamber to cool the primary coil;

an inlet conduit for supplying coolant to the coolant chamber;

an outlet conduit for draining coolant from the coolant chamber; and a second location at which the inlet conduit and the outlet conduit are connected to the coolant chamber, wherein the second location is spaced apart from the first location.

2. The charging paddle according to claim 1, wherein the wire is spaced from the inlet conduit and the outlet conduit.

3. The charging paddle according to claim 1, further including a front portion and a rear portion, wherein the primary coil and the coolant chamber are located in the front portion, an opening is formed in the rear portion to function as a handle, and wherein the wire is located at one side of the opening and the inlet conduit and the outlet conduit are located at an opposite side of the opening.

4. The charging paddle according to claim 1, wherein the inlet conduit and the outlet conduit are parallel to each other and are spaced from one another in a lateral direction of the paddle.

5. The charging paddle according to claim 1, wherein the coolant chamber is divided into two sub-chambers by the primary coil, which is generally planer.

6. The charging paddle according to claim 5, wherein the sub-chambers have the same dimension as measured in a direction perpendicular to the plane of the paddle.

7. The charging paddle according to claim 5, wherein the inlet conduit is connected to one of the sub-chambers at the second location, and the outlet conduit is connected to the other sub-chamber at the second location, and wherein the sub-chambers are connected by a connecting passage.

8. The charging paddle according to claim 1, wherein the primary coil includes copper foils that are laminated with insulating substrates.

9. The charging paddle according to claim 8, wherein each side of the primary coil is covered by an insulating coating.

10. The charging paddle according to claim 1, wherein the coolant is water.

11. The charging paddle according to claim 1, wherein the coolant is insulating oil.

12. A charging paddle of a charger coupling, wherein the charging paddle has a front portion and a rear portion, wherein the charging paddle is plugged into and is insulated from a receptacle when charging a battery connected to the receptacle, and wherein the charging paddle comprises:

a thin annular primary coil for inducing electromotive force in the receptacle, wherein the primary coil is located at the front portion of the paddle;

a wire for supplying electricity to the primary coil;

a first location at which the wire is connected to the primary coil;

a coolant chamber through which coolant flows to cool the primary coil, wherein the coolant chamber is located at the front portion of the paddle and is shaped to correspond to the shape of the primary coil;

an inlet conduit for supplying coolant to the coolant chamber;

an outlet conduit for draining coolant from the coolant chamber;

a second location at which the inlet conduit and the outlet conduit are connected to the coolant chamber, wherein the second location is spaced apart from the first location; and a handle formed by forming an opening at the rear portion of the paddle, wherein the wire is located at one side of the opening and the inlet conduit and the outlet conduit are located at an opposite side of the opening, and wherein the inlet conduit and the outlet conduit are spaced from one another in a lateral direction of the paddle.

13. The charging paddle according to claim 12, wherein the coolant chamber is divided into two sub-chambers by the primary coil, which is generally planer.

14. The charging paddle according to claim 13, wherein the sub-chambers have the same dimension as measured in a direction perpendicular to the plane of the paddle.

15. The charging paddle according to claim 12, wherein the primary coil includes copper foils that are laminated with insulating substrates.

16. The charging paddle according to claim 15, wherein each side of the primary coil is covered by an insulating coating.

17. The charging paddle according to claim 12, wherein the coolant is water.

18. The charging paddle according to claim 12, wherein the coolant is insulating oil.

19. A charging paddle of a charger coupling, wherein the charging paddle is generally planar and has a front portion and a rear portion, wherein the charging paddle is plugged into and is insulated from a receptacle when charging a battery connected to the receptacle, and wherein the charging paddle comprises:

a thin annular primary coil for inducing electromotive force in the receptacle, wherein the primary coil is located at the front portion of the paddle;

a wire for supplying electricity to the primary coil;

a first location at which the wire is connected to the primary coil;

a coolant chamber through which coolant flows to cool the primary coil, wherein the coolant chamber is located at the front portion of the paddle and is shaped to correspond to the shape of the primary coil, wherein the coolant chamber is divided into two sub-chambers by the primary coil, which lies in the plane of the paddle;

an inlet conduit for supplying coolant to the coolant chamber;

an outlet conduit for draining coolant from the coolant chamber, wherein the outlet conduit is aligned with the inlet conduit in a direction perpendicular to the plane of the paddle;

a second location at which the inlet conduit is connected to one of the sub-chambers and the outlet conduit is connected to the other sub-chamber, wherein the second location is spaced from the first loation;

a connecting passage to connect the sub-chambers to each other; and a handle formed by forming an opening at the rear portion of the paddle, wherein the wire is located at one side of the opening and the inlet conduit and the outlet conduit are located at an opposite side of the opening.

20. The charging paddle according to claim 19, wherein the sub-chambers have the same dimension as measured in a direction perpendicular to the plane of the paddle.

* * * * *

UNITED STATES PATENT AND TRADEMARK OFFICE
CERTIFICATE OF CORRECTION

PATENT NO. : 6,175,212 B1
DATED : January 16, 2002
INVENTOR(S) : Kouji Oguri

It is certified that error appears in the above-identified patent and that said Letters Patent is hereby corrected as shown below:

Title page,
Under Item [54] Title please change, "CHARGING PADDLE" to -- CHARGING PADDLE WITH COOLING --;

Column 8,
Lines 5-6 please change, "apparatus may 1 may be" to -- apparatus 1 may be --.

Signed and Sealed this

Twenty-first Day of May, 2002

Attest:

JAMES E. ROGAN
Attesting Officer    Director of the United States Patent and Trademark Office